United States Patent [19]

Klinger

[11] 4,099,112
[45] Jul. 4, 1978

[54] METHOD AND MEANS FOR SEEKING MAGNETIC TRACKS

[75] Inventor: Lance T. Klinger, Playa Del Rey, Calif.

[73] Assignee: Xerox Corporation, Stamford, Conn.

[21] Appl. No.: 735,717

[22] Filed: Oct. 26, 1976

[51] Int. Cl.² ............................................. G05B 13/00
[52] U.S. Cl. .................................... 318/561; 318/617
[58] Field of Search ............... 318/561, 576, 603, 617; 360/75, 77, 78

[56] References Cited

U.S. PATENT DOCUMENTS

| | | | |
|---|---|---|---|
| 3,241,015 | 3/1966 | Allen | 318/561 X |
| 3,699,555 | 10/1972 | Du Vall | 318/561 UX |
| 3,721,882 | 3/1973 | Helms | 318/603 X |
| 4,031,443 | 6/1977 | Droux et al. | 318/561 |

Primary Examiner—B. Dobeck
Attorney, Agent, or Firm—Barry Paul Smith

[57] ABSTRACT

In connection with a head positioning device for magnetic disc drives in which a low cost implementation for seeks of varying lengths is important and optimum seek time is secondary, a system is disclosed in which head velocity, at least during the final portion of the deceleration phase, is a linear function of the distance remaining to target. In addition, the system lends itself to the approximation of optimum seek time on long seeks by commanding a velocity curve whose slope exceeds the maximum deceleration of the torquer for all but the final portion of the seek distance so as to provide a maximum acceleration-deceleration profile until just prior to the target, and a final deceleration at a decreasing rate as the head approaches the target.

6 Claims, 14 Drawing Figures

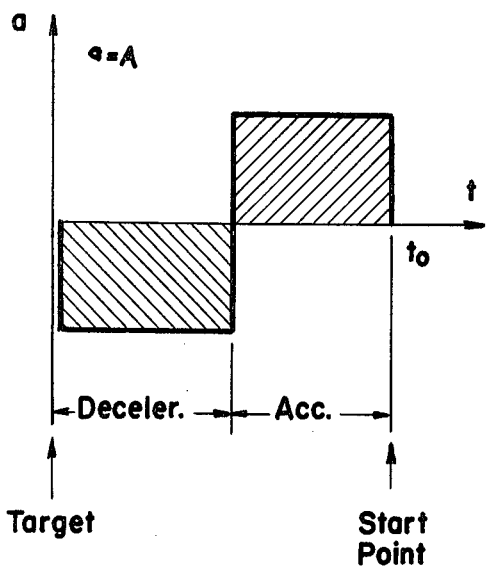
FIG _ 1a
(PRIOR ART)
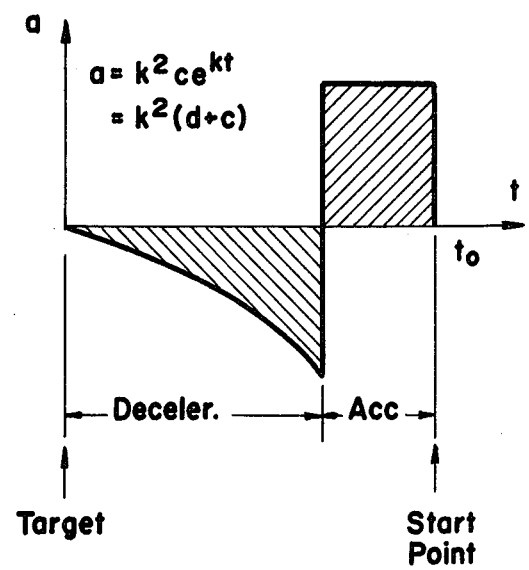
FIG _ 2a
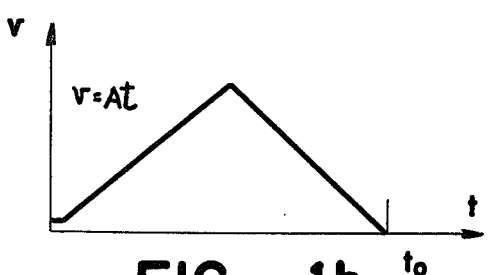
FIG _ 1b
(PRIOR ART)
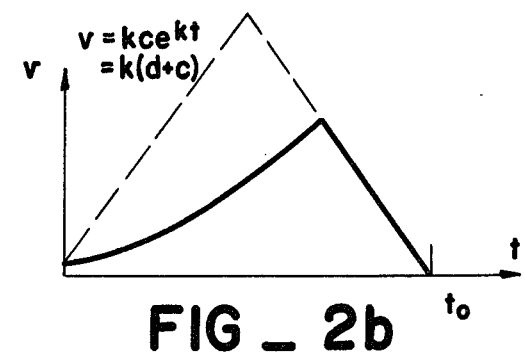
FIG _ 2b
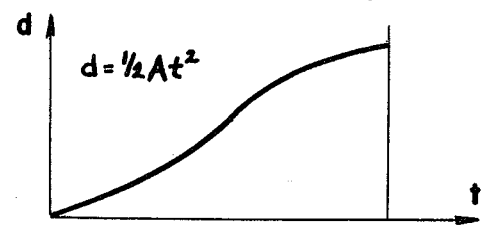
FIG _ 1c
(PRIOR ART)
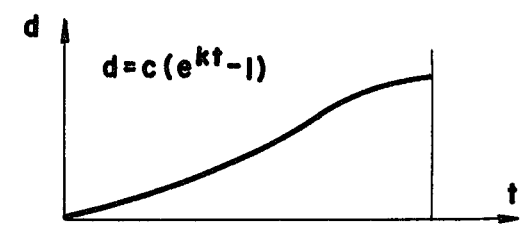
FIG _ 2c
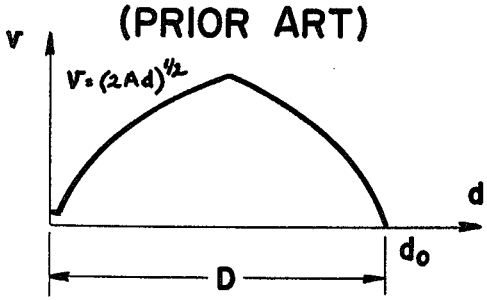
FIG _ 1d
(PRIOR ART)
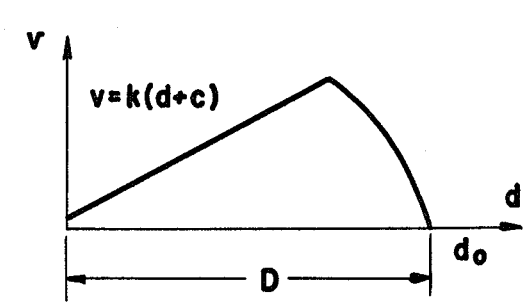
FIG _ 2d

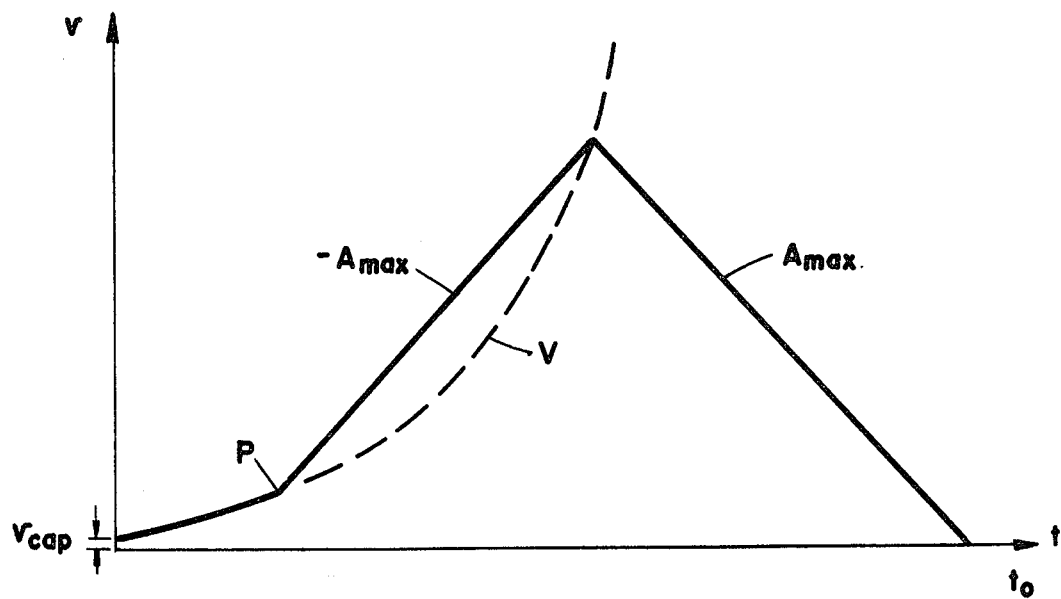
FIG _ 3
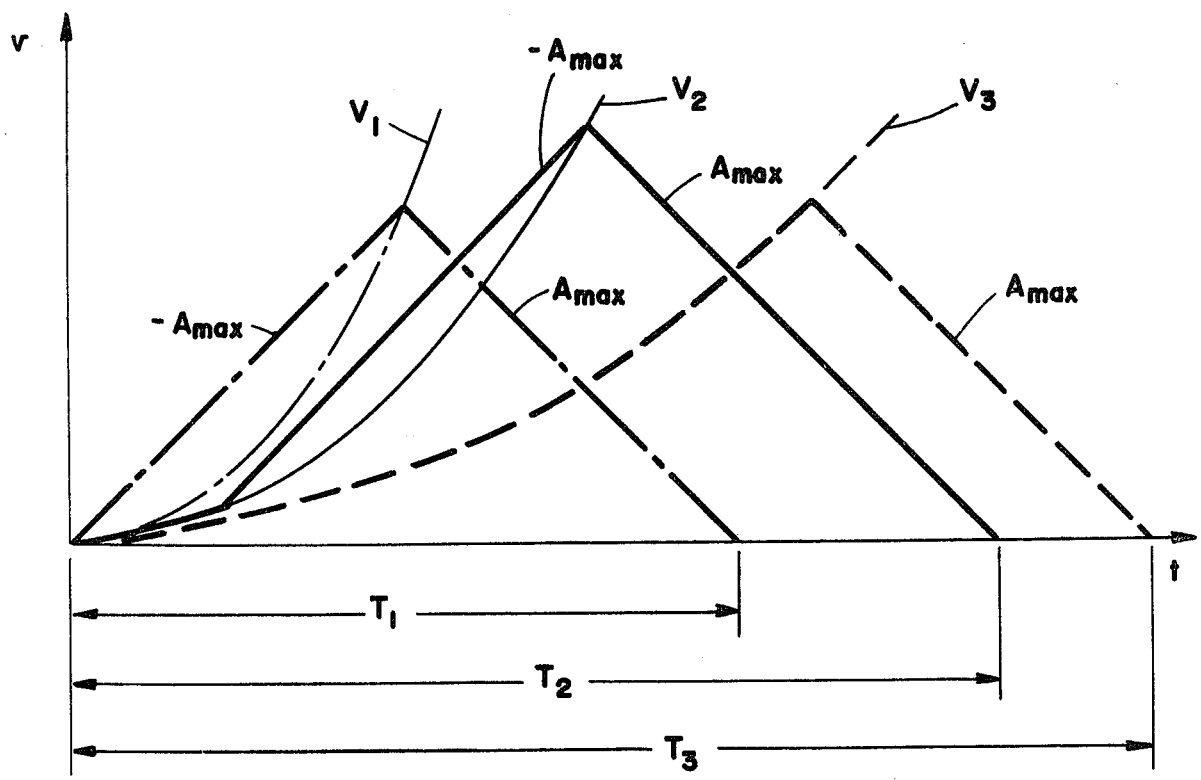
FIG _ 5

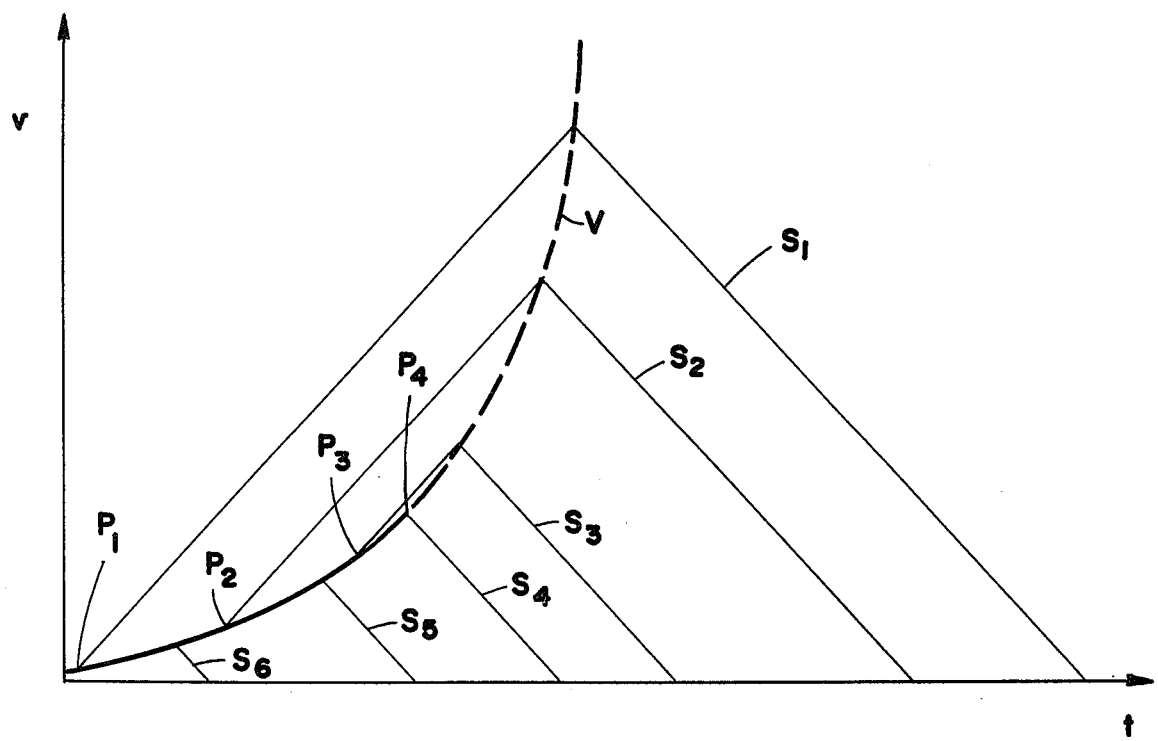
FIG _ 6
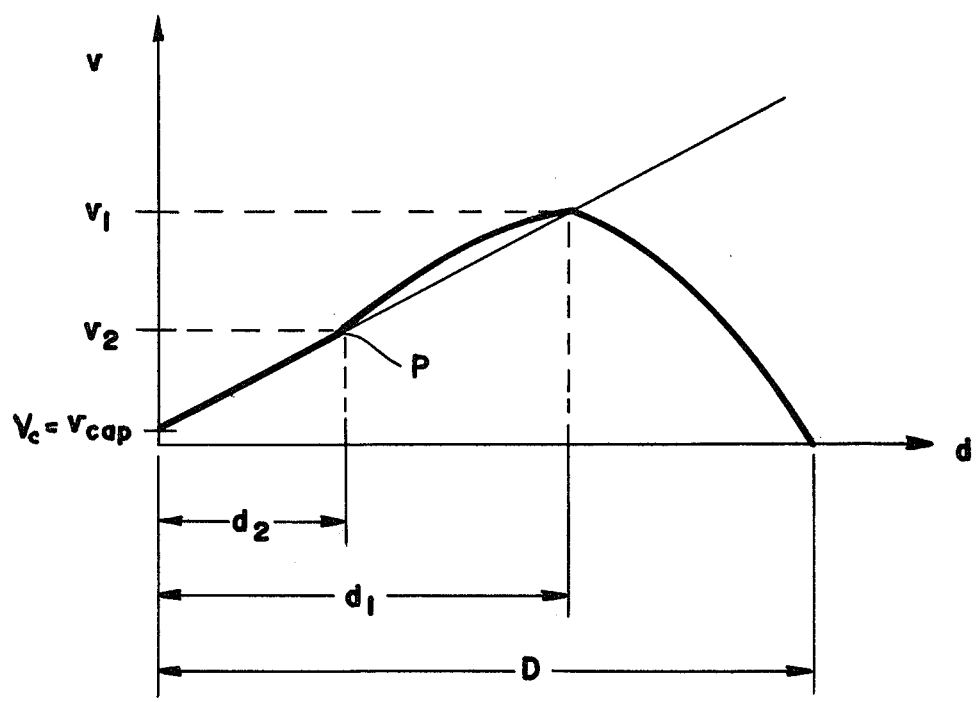
FIG _ 7

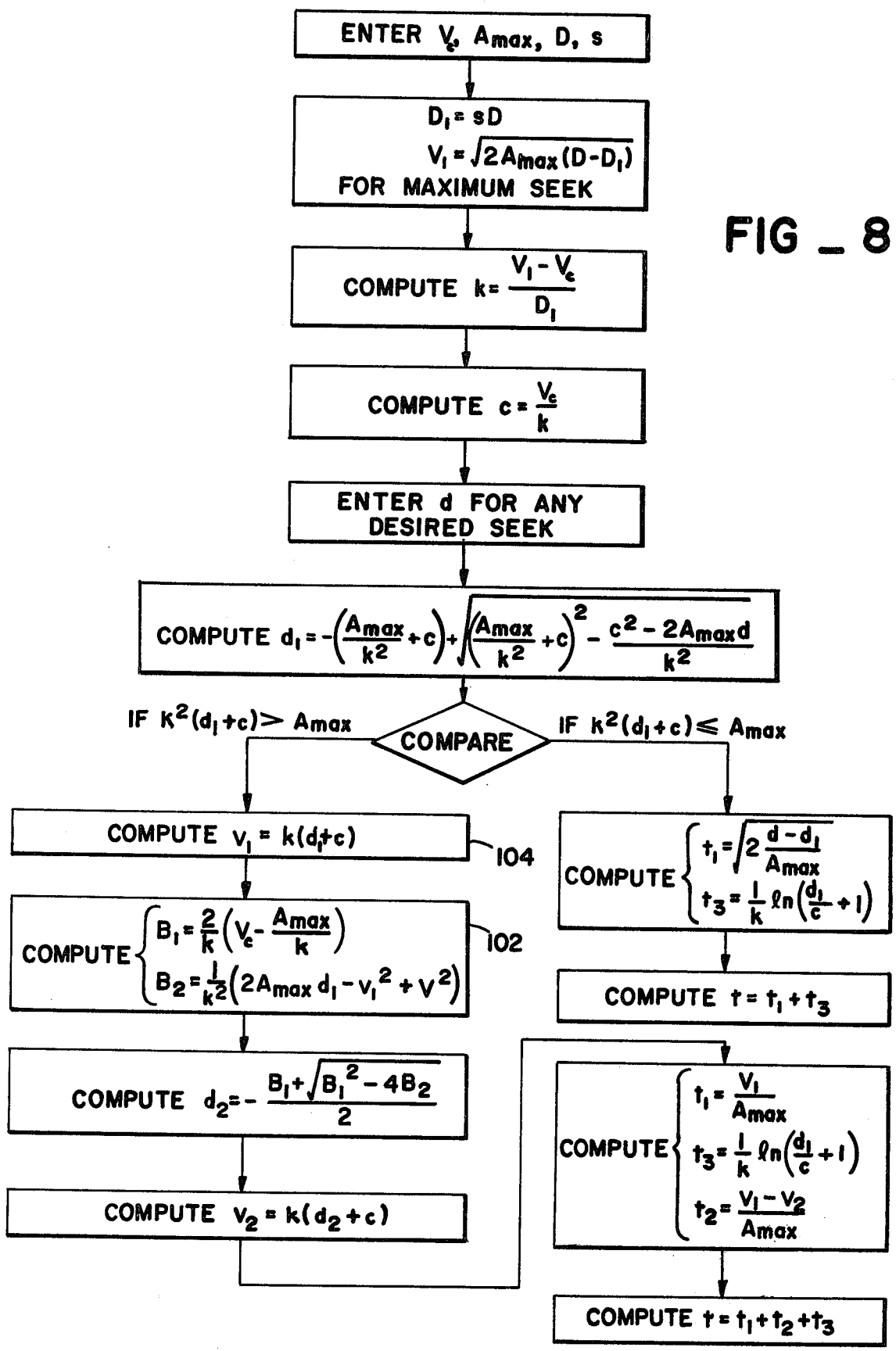
FIG _ 8

METHOD AND MEANS FOR SEEKING MAGNETIC TRACKS

BACKGROUND OF THE INVENTION

In the manufacture of disc drives, the design effort in regard to head positioning devices has previously been directed to minimizing the seek time as the head is moved from one data track to another. This is normally accomplished by accelerating the head at a constant rate up to the midpoint (in time) of the seek, and then decelerating at the same rate so that the head velocity falls to zero at the destination track. The resulting acceleration-deceleration profile is known as a time-optimal or minimum access profile. In practice, this method, though effective, requires expensive electronics, precision in manufacture, and the provision of a position sensor for assuring accurate capture of the destination track.

There are many applications for disc drives in which the cost of the unit is more important than time-optimal performance. The approach described in my copending application Ser. No. 735,851, filed Oct. 26, 1976, entitled *METHOD AND MEANS FOR CAPTURING MAGNETIC TRACKS;* Ser. No. 735,852, filed Oct. 26, 1976, entitled *METHOD AND MEANS FOR TRACKING MAGNETIC TRACKS;* and Ser. No. 735,716, filed Oct. 26, 1976, entitled *METHOD AND MEANS FOR INCREASING THE STIFFNESS OF LIMITED FREQUENCY SERVO SYSTEMS,* permits the cost of a disc drive to be substantially reduced as compared to conventional units while retaining most of their significant performance characteristics.

As explained in the aforementioned copending application Ser. No. 735,851 entitled *METHOD AND MEANS FOR CAPTURING MAGNETIC TRACKS,* the head positioning system used in my low-cost disc drive avoids the use of a position sensor by making a blind seek, capturing the second track reached by the head after its velocity drops below a predetermined capture velocity, and making another seek if the captured track is not the desired one. Very short seeks (e.g. 16 tracks or less) are more advantageously handled by digitally counting track crossings, because the low head velocities encountered on such very short seeks allow accurate digital counting; and therefore such very short seeks are not involved in the present invention.

SUMMARY OF THE INVENTION

In accordance with this invention, a low, smooth deceleration upon approaching the track to be captured is provided by decelerating the head so that the head velocity varies linearly as a function of the distance remaining to target. However, although this method is very useful for relatively short seeks, the use of this method does substantially increase the seek time for long seeks as compared to the time-optimal approach.

In accordance with a second aspect of the invention, the latter problem is minimized by providing a semi-time-optimal seek profile. Both aspects of the invention are achieved through the use of a torque control circuit for the head torquer which attempts to drive the head torquer at a velocity linear with respect to remaining target distance but is prevented from doing so on long seeks until shortly before the target, by a limiting circuit which limits acceleration and deceleration of the head to equal, predetermined maximums.

With the circuit of this invention properly adjusted, the acceleration-deceleration profile on the longest possible seeks is essentially time-optimal. As the seek length decreases (and the seek time becomes less material), the profile becomes less time-optimal although still better than the linear velocity distance profile. Finally, for seeks of less than about half the maximum seek length, the seek time is determined entirely by the linear velocity-distance profile.

It is thus an object of the invention to provide a control system for head positioning mechanisms of disc drives in which the head velocity upon deceleration is a linear function of the head's distance from the target.

It is a further object of the invention to provide a control system of the type described which produces a semioptimal acceleration-deceleration profile to combine near-optimum seek time on long seeks with a low, smooth target deceleration independent of the seek length.

It is another object of the invention to provide a torque control system of the type described in which the head torquer is commanded to maintain a velocity which is a linear function of the distance remaining to target, but in which the acceleration and deceleration necessary to carry out that command are limited.

BRIEF DESCRIPTION OF THE DRAWINGS

FIGS. 1*a* through *d* show the time-optimal profile of the prior art in terms, respectively, of acceleration, velocity, and distance to target as functions of time to target, and of velocity as a function of distance to target;

FIGS. 2*a* through *d* show the linear velocity-distance profile of this invention in diagrams corresponding to those of FIGS. 1*a* through *d;*

FIG. 3 shows the semi-time-optimal profile of this invention in terms of velocity as a function of time to target;

FIG. 5 is a diagram of velocity as a function of time to target showing the effect of varying the proportioning resistor of FIG. 4;

FIG. 6 is a diagram of velocity as a function of time to target showing the variation of the seek profile in the semi-time-optimal system of the invention for seeks of various lengths;

FIG. 7 shows the semi-time-optimal profile of this invention in terms of velocity as a function of distance to target.

FIG. 8 is a computational flow chart for FIG. 7.

DESCRIPTION OF THE PREFERRED EMBODIMENT

Figure 4:
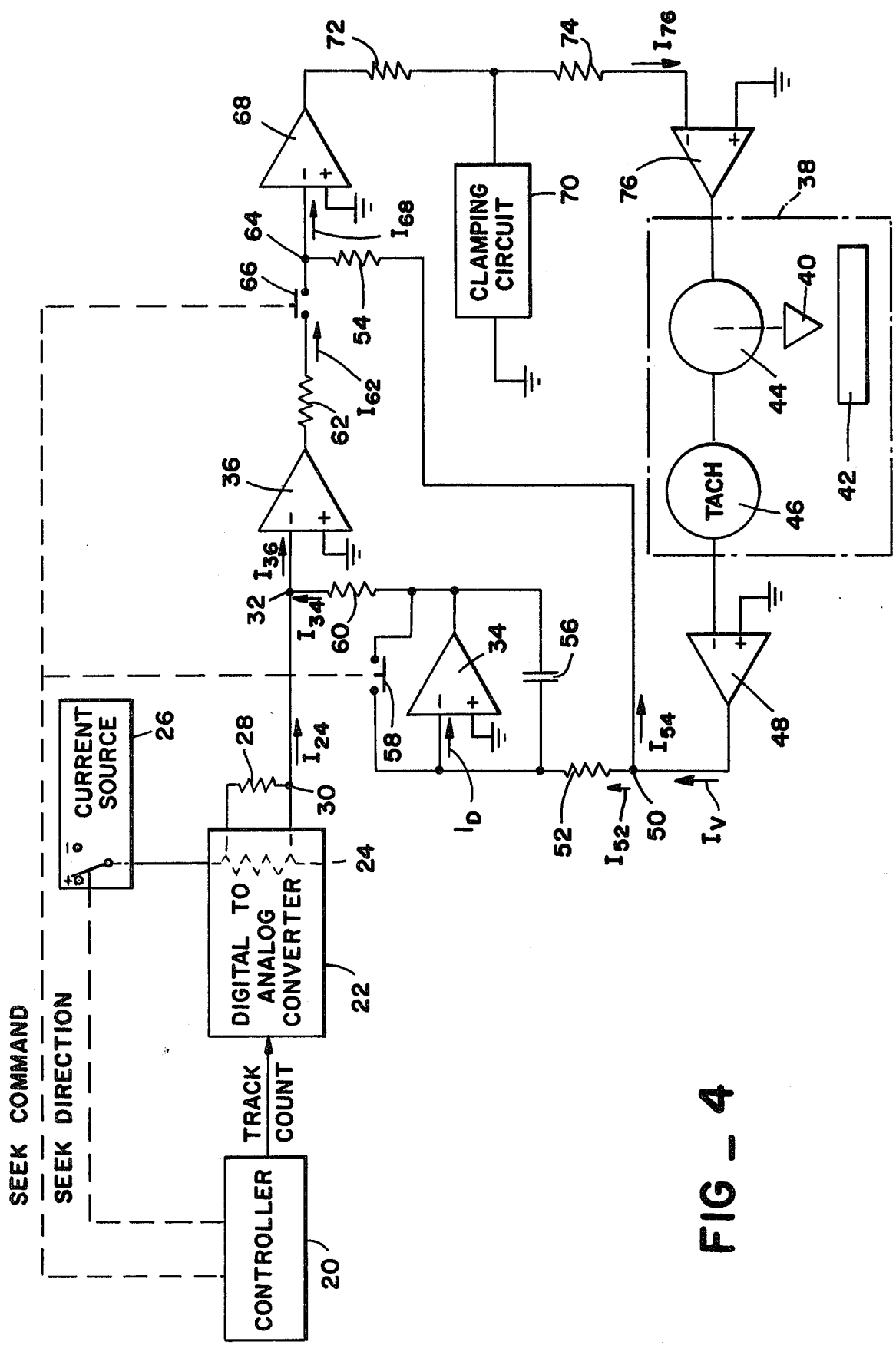
FIG. 4 is a circuit diagram, partly in block form, showing the inventive circuit for producing the profiles of FIGS. 2 and 3.

FIG. 1 through 3 illustrate in graph form the physical relationships involved in moving the head of a disc drive from one track to another during a seek. In considering these graphs, it should be understood that all curves are to be read from right to left, i.e. the abscissa represents distance or time from the target (represented by the ordinate axis) rather than distance or time from the origin of the seek. Referring now to FIG. 1, the known laws of physics dictate the fact that the fastest way of moving the head from one track to another is to accelerate it at a constant maximum rate (the maximum rate being dictated by the electromechanical parameters of the head assembly and torquer) for one-half of the time to target, and then decelerating it at the same rate for the second half of the time to target (FIG. 1a). For the purposes of this discussion, the target is the head position at which the head capture sequence (such as that described in my copending application Ser. No. 735,851, filed Oct. 26, 1976 and entitled *METHOD AND MEANS FOR CAPTURING TRACKS* is initiated. Inasmuch as the capture sequence requires the head to have a small residual velocity at the target, the deceleration is stopped slightly short of the target, and the head is allowed to drift the rest of the way.

FIGS. 1b through 1d show, respectively, the effect of the acceleration pattern of FIG. 1a on head velocity as a function of time, distance to target (i.e. head position) as a function of time, and head velocity was a function of distance to target. It should be noted in particular that the deceleration portion of the velocity vs. distance-to-target curve of FIG. 1d is nonlinear.

Minimum access time systems having the relationship of FIG. 1 are currently in general use in the disc drive art. Although they have the advantage of being time-optimal, they require precise position information and are expensive both from a mechanical and an electronic point of view.

In low-cost disc drives, where a minor loss of speed can be tolerated if a substantial cost saving is gained thereby, the present invention provides a simple and inexpensive way to control the head torquer by commanding the torquer during the entire seek to maintain a velocity directly proportional to the distance from the target, i.e. $v = k(d+c)$ where $k$ is a proportionality factor and $c$ is the distance beyond the target at which $v$ would be zero in order to maintain the desired residual velocity at the target. This will result in driving the torque at maximum acceleration until the actual velocity reaches the commanded velocity V; thereafter, the torquer decelerates at a decreasing rate to maintain the $v = k(d+c)$ relationship.

FIG. 2b (in which the seek distance covered in a given time is represented by the area under the curve) graphically shows how the head velocity during the deceleration phase of the linear velocity-distance profile (solid line) is consistently below the time-optimal velocity (dotted line), thus causing the FIG. 2 seek to cover substantially less distance than a FIG. 1 seek in the same time interval, given the same maximum acceleration. However, besides requiring much less complex electronics, the FIG. 2 profile has the advantage of providing a smooth deceleration near the target which not only avoids the jerks that tend to occur close to the capture region when the minimum access time system suddenly switches from full deceleration to drift just before the target, but also makes possible the capture method of the aforesaid copending application Ser. No. 735,851 entitled *METHOD AND MEANS FOR CAPTURING MAGNETIC TRACKS*.

The deceleration profile of FIG. 2 can best be mathematically compared to the prior art profile of FIG. 1 by the following chart giving the respective equations for the deceleration portions of FIGS. 1 and 2:

| FIG. 1 profile | FIG. 2 profile |
|---|---|
| $a(t) = A_{max}$ | $a(t) = k^2 c e^{kt}$ |
| $v(t) = A_{max} t$ | $v(t) = k\, c e^{kt}$ |
| $d(t) = \frac{1}{2} A_{max} t^2$ | $d(t) = c(e^{kt} - 1)$ |
| $v(d) = \sqrt{2 A_{max} d}$ | $v(d) = k(d + c)$ | in which a is the instantaneous value of the deceleration at any given point on the profile, and $A_{max}$ is the maximum allowable value of a dictated by the mechanical design of the head mechanism.

The target distance d is a relatively easy parameter to derive by electronically integrating the output of a tachometer connected to the head torquer, as explained in more detail in the discussion of FIG. 4 below. The time to target, on the other hand, is itself an unknown and therefore not measurable. It will thus be seen that in the FIG. 2 profile, the velocity to be commanded at any given point in the travel of the head is readily expressed in analog form as a linear function of that point's distance from the target. On the other hand, in the FIG. 1 profile, $v$ is a square-root function of d whose analog is much more complex and expensive to produce accurately.

In accordance with a further aspect of the invention, the advantages of the minimum access system can be retained for long seeks (where seek time minimization matters most) without defeating the advantages of the smooth-approach system by implementing the semi-time-optimal system of FIG. 3. In that system, the proportionality constant $k$ of the smooth-approach system is so chosen that when the actual velocity v reaches the commanded velocity V at the end of the acceleration phase, the steep angle of the velocity vs. time curve (FIG. 3) will command a deceleration rate greater than the maximum deceleration rate allowed by the control system of this invention. As a result, the system will decelerate at the maximum (and hence time-optimal) deceleration rate until the maximum deceleration curve interesects the commandedvelocity curve V. Thereafter, the deceleration will decrease smoothly toward zero at the target as in the FIG. 2 profile. The point of intersection P between the maximum deceleration line $-A_{max}$ and the curve V is determined by the choice of $k$ and can therefore be made more or less close to the target as desired.

FIG. 4 illustrates the apparatus which, in accordance with this invention, implements the inventive principles discussed above. A conventional controller 20 determines when a seek is to be made, the direction of the seek, and the length of the seek in terms of a digital track count. The track count is translated into an analog current signal representative of the length D (FIGS. 1d and 2d) of the seek by a conventional digital-to-analog converter 22 which, in essence, varies the resistance of resistance network 24 in accordance with the digital track count. The polarity of the analog current signal is set by the seek direction output of controller 20 merely by appropriately switching the polarity of the current source 26. The fixed shunt resistor 28 represents the quantity c described hereinabove.

Consequently, it will be seen that the current $I_{24}$ flowing between junctions 30 and 32 is proportional to the quantity (D + c). At junction 32, a portion of this current is drained off by amplifier 34 (or, to put it another way, a current output $-I_{34}$ from aplifier 34 having a polarity opposite to that of $I_{24}$ is added to $I_{24}$) to produce a resultant current $I_{36}$ at the input to amplifier 36. Amplifiers 34 and 36, as well as the other amplifiers referred to in this description, are algebraically inverting current amplifiers, i.e. their output current is proportional to the input current but of the opposite polarity.

The head assembly 38 includes the head 40 which is moved between the tracks of magnetic disc 42 by a torquer 44. The torquer 44 also drives a tachometer 26 whose algebraic output represents the amplitude and direction of the actual head velocity v. Amplifier 48 translates the tachometer output into an actual-velocity current signal $I_v$, which, at junction 50, is split into two parts $I_{52}$ and $I_{54}$, respectively. Inasmuch as $I_{52}$ and $I_{54}$ have a constant relationship determined by the values of load resistors 52 and 54, both $I_{52}$ and $I_{54}$ are still proportional to the actual velocity v.

The actual velocity signal $I_{54}$ is integrated by capacitor 56 so as to produce, at the input of amplifier 34, a current I proportional to $(d-D)$, i.e. the distance traveled by the head 40 from the origin $d_o$ (FIG. 2d) of the seek toward the target. During a seek, the normally closed switch 58 (actually an electronic switch) is open, so that amplifier 34, in conjunction with a properly proportioned load resistor 60, will produce a current $I_{34}$ which, when combined with current $I_{24}$ at junction 32 will produce a resultant current $I_{36}$ proportional to $(D + c) + (d - D)$, or simply $(d + c)$.

Amplifier 36 and proportioning resistor 62 (whose value determines the proportionality factor $k$) translates $I_{36}$ into a commanded-velocity current signal $I_{62}$ proportional to $k(d + c)$ or V. During a seek, $I_{62}$ is combined with the actualvelocity current signal $I_{54}$ at junction 64 through the then closed switch 66. The polarity of $I_{54}$, as a study of the circuit of FIG. 4 will readily show, is opposite to the polarity of $I_{62}$ during a seek. Consequently, the input current $I_{68}$ to amplifier 68 is proportional to the difference between the commanded head velocity and the actual head velocity.

The amplitude of the output of amplifier 68 is limited by a conventional clamping circuit 70 which sets the maximum acceleration and deceleration rate to which the head 40 is designed to be subjected (about 1.5 to 2 g in a typical embodiment). Thus, the clamping circuit 70 determines the slope of the linear portions $A_{max}$ and $-A_{max}$ of the velocity vs. time curve of FIG. 3.

As thus limited by the clamping circuit 70 and proportioned by the load resistors 72, 74, the output current of amplifier 68 becomes the acceleration command which the servo driver amplifier 76 translates into a torque control signal adapted to operate the torquer 44 so as to accelerate or decelerate the head 40.

When, upon approaching the target, the head velocity drops below the predetermined capture velocity $v_{cap}$, the controller 20 switches from seek to capture mode as described in The aforementioned copending application Ser. No. 735,851 entitled METHOD AND MEANS FOR CAPTURING MAGNETIC TRACKS. At that time, switch 66 opens, disconnecting the $I_{62}$ source from the input of amplifier 68. Simultaneously, switch 58 closes to short out amplifier 34 and discharge integrating capacitor 56 to reset it for the next seek.

FIG. 5 shows the effect of varying the value of proportioning resistor 62, i.e. varying the proportionality factor k. For a seek of a given length D, the seek profile can be theoretically completely time-optimized by setting the proportionality factor $k$ so that the $-A_{max}$ line intersects the $V_1$ line at the target (dot-dash lines). The seek time for this setting is $T_1$.

A somewhat lower setting of $k$ results in the semi-time-optional profile of this invention (solid lines). At that setting, the operation of the circuit is as described above in connection with FIGS. 3 and 4, resulting in a somewhat longer seek time $T_2$.

If $k$ is set still lower (dotted lines), a setting is reached where the $A_{max}$ line intersects the commandedvelocity line $V_3$ below the point where it is tangential to the slope $-A_{max}$. In that condition, the circuit of FIG. 4 operates in the linear velocity-distance deceleration mode of FIG. 2, and the seek time increases to $T_3$.

It has been previously mentioned that the semi-timeoptional mode of this invention tends to optimize long seeks but not short ones. The reason for this is illustrated in FIG. 6. In that figure, profiles for six seeks $S_1$ through $S_6$ of different lengths, with the same setting of proportionality factor $k$, are depicted. Seek $S_1$ represents the maximum seek across all 1024 data tracks of a typical disc. The proportionality factor $k$ is best set so that intersecting point $P_1$ is just short of the the target, thus making the maximum seek $S_1$ almost time-optimal.

Using the same commanded-velocity curve V and the same acceleration and deceleration limits, a somewhat shorter seek $S_2$ causes the intersection point $P_2$ to move upward on the curve V, resulting in a profile somewhat less optimized but still markedly superior to the linear velocity-distance profile.

The optimization diminishes to a small amount with a still shorter seek $S_3$, and disappears altogether when the seek length decreases to that of $S_4$, where the rising part of the seek curve $S_4$ intersects the curve V at the point $P_4$ where it is tangential to the maximum deceleration slope.

For the seek $S_4$ and the even shorter seeks $S_5$ and $S_6$, the circuit operates in the linear velocity-distance mode of FIG. 2; however, these seeks are short enough so that time optimization for them is not a matter of major concern.

FIG. 7 illustrates the relationships from which the total seek time t for any given seek, as well as other profile parameters, can be determined from the known parameters $A_{max}$ and $v_{cap}$. In the graph of FIG. 7, which shows velocity as a function of distance to target for the semi-time-optimal mode of FIG. 3, $v_1$ designates the peak velocity occurring at the boundary between the acceleration phase and the deceleration phase of the seek; $v_2$ designates the velocity at point P of FIGS. 3 and 7, and $v_{cap}$ disignates the capture or target velocity. The acceleration-deceleration boundary occurs at a distance $d_1$ from the target, while the target distance corresponding to the switchover point P from constant maximum deceleration to decreasing deceleration is designated $d_2$.

For the longest seek, the distance $d_1$ may be expressed as $$D_1 = sD$$

in which $s$ is a design factor dependent on $k$, $c$, and $A_{max}$, and therefore determined in the physical embodiment of FIG. 4, by the relationship to each other of the parameters of resistors 28 and 62 and clamping circuit 70. As the discussion of FIG. 8 below will show, it is desirable from a time optimization standpoint to make s as close to 0.50 as possible. On the other hand, the tolerances of a physical device require s to be sufficiently greater than 0.50 so that these tolerances can never cause the constant deceleration portion of a seek to extend beyond the target, as such condition would tend to cause a malfunction of the capture circuit described in my aforementioned copending application Ser. No. 735,851 entitled METHOD AND MEANS FOR CAPTURING MAGNETIC TRACKS. As a practical matter s is usually best chosen to be about 0.51 to 0.52.

To illustrate the significatnce of a proper choice of s, the total seek time t to the target can be computed for any given value of s in accordance with the flow chart of FIG. 8. Inasmuch as the constant k (i.e. the slope of the V line in FIG. 7) is the same for all seeks, it must first be calculated from the values of $V_1$ and $D_1$ (i.e. $v_1$ and $d_1$, respectively, for the longest seek). Knowing $k$ and the designer-selected capture velocity $v_{cap}$, c can readily be determined.

With this information, $d_1$ can be derived for any seek by remembering that $d_1$ is the distance from target at which the velocity on the commanded-deceleration curve is the same as the velocity on the maximum-acceleration curve, or $$k(d_1 + c) = \sqrt{2 A_{max}(d - d_1)}$$

This expression is a quadratic equation, with respect to $d_1$, whose real root can readily be demonstrated to be $$d_1 = -(\frac{A_{max}}{k^2} + c) + \sqrt{(\frac{A_{max}}{k^2} + c)^2 - \frac{c^2 - 2 A_{max} d}{k^2}}$$

Depending on the length of the seek, one of two things can happen: either the seek is long enough to contain a maximum-deceleration portion (seeks $S_1$, $S_2$, and $S_3$ of FIG. 6) or it is short enough to go directly from the maximum-acceleration portion into the linear velocity vs. distance deceleration mode (seeks $S_4$, $S_5$ and $S_6$ of FIG. 6). Inasmuch as the commanded deceleration at the acceleration-deceleration boundary is $$A = -(k^2(d_1 + c))$$

there will be a maximum-deceleration portion if $|A| > A_{max}$.

It can be readily demonstrated by analyzing the geometry of the three-portion velocity curve of FIG. 7 that $$d_2 = \frac{-B_1 + \sqrt{B_1^2 - 4B_2}}{2}$$

in which $B_1$ and $B_2$ are the mathematical expressions identified in box 102 of FIG. 8, in terms of the value of $v_1$ shown in box 104.

Knowing $d_2$, the velocity $v_2$ at point P is readily computed. Finally, with $d_1$, $d_2$, $v_1$ and $v_2$ all known, the three elements of the total seek time $t$ can be computed as follows:

$$t_1 = \frac{v_1}{A_{max}} = \sqrt{2 \frac{d - d_1}{A_{max}}}$$

for the acceleration portion of the seek;

$$t_2 = \frac{v_1 - v_2}{A_{max}}$$

for the maximum-deceleration portion of the seek; and $$\frac{dx}{dt} = k(x + c)$$

for the linear velocity vs. distance portion of the seek, in which $x$ is the distance from target at any moment in that portion of the seek. Integrating the last-mentioned expression, we get $$\ln(x + c) \Big|_0^{d_2} = kt \Big|_0^{t \text{ of } d_2}$$

which yields, for the linear velocity vs. distance portion, $$t_3 = \frac{1}{k} \ln\left(\frac{d_2}{c} + 1\right)$$

The total seek time is, of course, $$t = t_1 + t_2 + t_3.$$

For the short seeks which do not have a maximumacceleration portion, there is no $d_2$, $v_2$, or $t_2$, and $t_3$ becomes $$t_3 = \frac{1}{k} \ln\left(\frac{d_1}{c} + 1\right)$$

and $$t = t_1 + t_3.$$

By carrying out the foregoing computations as discussed in connection with FIG. 8, it will be seen that the time $t_3$ from point P to the target, which is determined by the choice of $v_{cap \text{ and }} s$, can represent a substantial portion of the seek time even on the longest seek.

It will be seen that the invention provides not only a method of coupling a smooth, consistent capture approach with as near optimum as practical a seek time on very long seeks, but also a relatively simple structure which inherently carries out the very complex mathematical acceleration-deceleration profile of the method without the need for any computation of the acceleration-deceleration boundary or for any actual electronic switching between an acceleration and a deceleration phase.

What is claimed is:

1. In a disc drive having a head selectively alignable with any of a plurality of generally parallel data tracks, and means for performing a seek involving moving said head from one of said data tracks to another by accelerating said head at a constant maximum rate of acceleration until it reaches a maximum velocity, then decelerating it so as to reduce its velocity to a predetermined capture velocity in the vicinity of a target position just short of the destination track, apparatus for causing said head to approach said target position at a low rate of deceleration generally independent of the length of said seek, comprising:
    (a) means for producing an algebraic seek distance signal having a magnitude representative of the length of said seek and a sign representative of its direction;
    (b) velocity-sensing means associated with said head for producing an algebraic velocity signal having a magnitude representative of head velocity and a sign representative of the head's direction of movement;

(c) integrator means connected to integrate said velocity signal so as to produce a distance-traveled signal;

(d) first combining means connected to said seek-distance signal producing means and said integrating means to subtractively combine said seek-distance signal and said distance-traveled signal into a signal proportional to the distance remaining to target;

(e) second combining means connected to said first combining means and to said velocity-sensing means to subtractively combine said distance-remaining signal and said velocity signal to produce a torque signal; and (f) means responsive to said torque signal for driving said head with an acceleration proportional to said torque signal in both magnitude and sign.

2. The apparatus of claim 1, further comprising means connected to clamp said torque signal to prevent it from exceeding a predetermined maximum magnitude.

3. The apparatus of claim 1, further including means interposed between said first and second combining means for establishing the proportionality factor by which said distance-remaining signal is proportional to the distance remaining to target.

4. The apparatus of claim 1, further including means associated with said seek-distance signal producing means for establishing the residual velocity of said head at said target.

5. In a disc drive having a head selectively alignable with any of a plurality of generally parallel data tracks, and means for performing a seek involving moving said head from one of said data tracks to another by accelerating said head at a constant maximum rate of acceleration until it reaches a maximum velocity, then decelerating it so as to reduce its velocity to a predetermined capture velocity in the vicinity of a target position just short of the destination track, the method of causing said head to approach said target position as a low rate of velocity and deceleration generally independent of the length of said seek wherein the head is decelerated at a rate at which the plot of head velocity versus remaining distance to target is linear, said method comprising the steps of:

(a) producing an algebraic seek distance signal having a magnitude representative of the length of said seek and a sign representative of its direction;

(b) producing an algebraic velocity signal having a magnitude representative of head velocity and a signal representative of the head's direction of movement;

(c) integrating said velocity signal so as to produce a distance-traveled signal;

(d) subtractively combining said seek-distance signal and said distance-traveled signal into a signal proportional to the distance remaining to target;

(e) subtractively combining said distance-remaining signal and said velocity signal to produce a torque signal; and (f) driving said head with an acceleration proportional to said torque signal in both magnitude and sign.

6. In a disc drive having a head selectively alignable with any of a plurality of generally parallel data tracks, and means for performing a seek involving moving said head from one of said data tracks to another by accelerating said head at a constant maximum rate of acceleration until it reaches a maximum velocity, then decelerating it so as to reduce its velocity to a predetermined capture velocity in the vicinity of a target position just short of the destination track, the method of causing said head to approach said target position in a near-optimal amount of time on long seeks yet at a low rate of velocity and deceleration generally independent of the length of said seek wherein the head is decelerated at any point in the deceleration portion of said seek at the lower of a rate at which the plot of head velocity versus remaining distance to target is linear or a predetermined maximum deceleration rate, said method comprising the steps of:

(a) producing an algebraic seek distance signal having a magnitude representative of the length of said seek and a sign representative of its direction;

(b) producing an algebraic velocity signal having a magnitude representative of head velocity and a signal representative of the head's direction of movement;

(c) integrated said velocity signal so as to produce a distance-traveled signal;

(d) subtractively combining said seek-distance signal and said distance-traveled signal into a signal proportional to the distance remaining to target;

(e) subtractively combining said distance-remaining signal and said velocity signal to produce a torque signal;

(f) limiting the magnitude of said torque signal to a predetermined maximum; and (g) driving said head with an acceleration proportional to said torque signal in both magnitude and sign.

* * * * *